(12) United States Patent
Hauser et al.

(10) Patent No.: US 12,298,172 B2
(45) Date of Patent: May 13, 2025

(54) SECTORAL LOAD MEASUREMENT

(71) Applicant: FLSmidth Cement A/S, Valby (DK)

(72) Inventors: Armin Hauser, Schwabmüchen (DE); Daniel Kasperek, Mering (DE)

(73) Assignee: FLSmidth Cement A/S, Valby (DK)

( * ) Notice: Subject to any disclaimer, the term of this patent is extended or adjusted under 35 U.S.C. 154(b) by 88 days.

(21) Appl. No.: 18/031,067

(22) PCT Filed: Oct. 9, 2020

(86) PCT No.: PCT/IB2020/059501
§ 371 (c)(1),
(2) Date: Apr. 10, 2023

(87) PCT Pub. No.: WO2022/074437
PCT Pub. Date: Apr. 14, 2022

(65) Prior Publication Data
US 2023/0375395 A1    Nov. 23, 2023

(51) Int. Cl.
G01G 11/08 (2006.01)
G01G 13/24 (2006.01)

(52) U.S. Cl.
CPC ............ *G01G 11/08* (2013.01); *G01G 13/24* (2013.01)

(58) Field of Classification Search
CPC ................................ G01G 11/08; G01G 13/24
USPC .................................................... 73/861.351
See application file for complete search history.

(56) References Cited

U.S. PATENT DOCUMENTS

| 4,528,848 | A | 7/1985 | Hafner |
| 6,435,039 | B1 * | 8/2002 | Hubert ............... G01G 11/08 73/861.351 |
| 2007/0144791 | A1 | 6/2007 | Wolfschaffner |
| 2008/0217071 | A1 * | 9/2008 | Hafner ............... G01G 11/083 177/83 |
| 2020/0173832 | A1 * | 6/2020 | Hauser ............... G01F 11/24 |
| 2021/0123791 | A1 * | 4/2021 | Kasperek ........... B65G 53/4616 |

FOREIGN PATENT DOCUMENTS

| CN | 213600189 U | * 7/2021 | |
| CN | 213932795 U | * 8/2021 | |
| DE | 3217406 A | * 11/1983 | ............ G01F 11/24 |
| DE | 20303126 U1 | * 5/2004 | ........... G01G 11/083 |

OTHER PUBLICATIONS

International Search Report and Written Opinion dated Jun. 15, 2021, 11 pages.

* cited by examiner

*Primary Examiner* — Peter J Macchiarolo
*Assistant Examiner* — Monica S Young
(74) *Attorney, Agent, or Firm* — Buchanan Ingersoll & Rooney PC

(57) ABSTRACT

The invention relates to a method for continuous, gravimetric metering and mass flow determination of flowable materials, comprising:
  determining with a metering device an instantaneous mass flow at an anticipatory control point located a first distance ahead of a delivery point for the flowable material;
  affecting discharge of the flowable material by altering a speed of rotation of the metering device and
  varying the first distance of the anticipatory control point ahead of the delivery point depending on at least one of a current actual speed and a loading of the metering device, wherein the loading of the metering device is calculated on the basis of a sectoral load measurement.

8 Claims, 6 Drawing Sheets

SECTORAL LOAD MEASUREMENT

FIELD OF THE INVENTION

This invention relates to a method and an apparatus for continuous, gravimetric metering and mass flow determination of flowable materials, with a metering device, especially a metering rotor with determination of the instantaneous mass flow.

BACKGROUND OF THE INVENTION

Such a system for continuous gravimetric supply and/or metering of bulk goods is known from DE 4023 948 A1, wherein a metering rotor balance according to DE 3217406 A1 or EP A 0 198956 is utilized. The metering device following a bulk goods feeder is arranged in a closed pneumatic conveyor path and a collector device with a cell wheel lock supported on load cells is connected afterwards. A computer-controlled, central metering system is used for the appropriate regulation of the desired feed amount per unit time (feed strength), such as is described in DE3 217 406 A1, wherein the weighing signal of the hopper weighing cells serves as an input signal and the speed of the metering rotor and optionally the cell wheel lock for the bulk goods feed are regulated. However, there is some regulation dead time until adjustment up to the set-point feed strength. This regulating system is described in more detail in the above-cited EPA 0 198956, wherein the bulk goods mass acting instantaneously in the rotor weighing path in the metering rotor balance is detected in the metering rotor balance, from which the bulk goods mass throughput is obtained by multiplication with the angular velocity of the metering rotor. The weighing electronics delay passing on the current weight value of the bulk goods mass (loading) present at the moment on the rotor weighing path (measuring path) up to a particular transfer point, so that the rotor angular velocity can be varied shortly before the discharge of the bulk material to the pneumatic conveyor line in accordance with the predetermined set-point conveyor strength, i.e. the metering rotor is accelerated or delayed. A relatively high metering accuracy results, which has generally proved itself in metering powdered bulk goods, for example in coal dust metering in rotary cement kilns or for metering additives in flue gas purification. With certain bulk goods however, such as additives for admixture in flue gas purification from power plants, it has to be recognized that these bulk goods can tend to "shooting or formation of bridges, depending on the degree of moisture, fluidization, fineness and the like, so that random or strongly pulsating bulk flow fluctuations (loading differences) can occur in the bulk goods feed. In this case the previously described metering device can hardly compensate for the short-term mass flow fluctuations on account of the inertia, since the metering rotor has a substantial own mass of some hundreds of kilograms, especially in a design resistant to pressure surges, so that the required changes in angular velocity for keeping the feed strength constant with strongly fluctuating mass flows, i.e. strong acceleration or deceleration of the metering rotor, are hardly possible on account of the mass inertia. These plus/minus fluctuations can be partially compensated in the first-mentioned system for feeding and/or metering bulk goods, in the way of forming an average value, in that a collecting container supported on load cells is provided. However, such a compensating container increases the expense of construction and the demand on space.

U.S. Pat. No. 6,435,039 discloses a method for continuous, gravimetric metering and mass flow determination of flowable materials, wherein the loading and varying the first distance of the anticipatory control point ahead of the delivery point depending on at least one of a current actual speed and a loading of the metering device. However, this system does not take into account that the loading in the rotor weighing path may not be constant over the rotor weighing path but measures the rotor weighing path loading as a total.

OBJECT OF THE INVENTION

It is an object of the present invention to overcome or at least alleviate one or more of the above problems of the prior art and/or provide the consumer with a useful or commercial choice.

It is an object of the present invention to provide a method for continuous, gravimetric metering and mass flow determination of flowable materials, wherein the loading of the metering device is calculated on the basis of a sectoral load measurement.

It is another object of the present invention to provide an apparatus to utilize the method for continuous, gravimetric metering and mass flow determination of flowable materials according to the present invention.

It is a further object of the present invention to provide an alternative to the prior art.

SUMMARY OF THE INVENTION

In consequence the invention is based on the object of providing a method and an apparatus for continuous gravimetric metering and mass flow determination, especially of bulk goods, with which an improved metering accuracy is attained in a simple way, even with strongly fluctuating conveyor material feed.

In a first aspect, the invention relates to an apparatus for continuous, gravimetric metering and mass flow determination of flowable materials. A metering device is configured to determine instantaneous mass flow at an anticipatory control point ahead of a delivery point at which flowable material is discharged. The discharge of the flowable material is controllable by altering a speed of rotation of the metering device. A metering controller is connected to the metering device and configured to detect an actual speed of rotation. Discharge at the delivery point is regulated in dependence on mass flow deviations at the metering device by variable location of the anticipatory control point. In a preferred embodiment, the loading of the metering device may be calculated on the basis of a sectoral load measurement.

The sectoral load measurement may divide a weighing path affecting the load measured at a load cell which may be a sector in the range of 200 to 300 degrees of a total of 360 degree rotor circle to a multiple of smaller sectors in the range of 1 to 20 degrees, such as 5 degrees, to calculate an integral of the load.

The sectors may also be in the range of 20 to 100 degrees.

While the chambers of the rotor are rotating, the load of the chambers in the first sector is continuously detected. As the chambers move through the following sectors their load is handed over to the sectors in which the chambers are presently.

The main difference between the present invention and the prior art lies in the mathematical way of evaluating the integral of the load of all chambers together while the chambers are rotating. The measurement is performed over time. The apparatus according to the present invention uses the change of the integral of time to draw a conclusion on the load of the single chambers.

The technical effect of this difference is that if the load of the single chambers are known to the apparatus, the adjusting of the motor speed can be adjusted more correctly to increase feed accuracy. Additionally, the apparatus can detect flow problems more accurately.

The problem which is solved by the present invention is the effect of varying loading over the chambers in the rotor weighing path could not be sufficiently detected which influenced the feed accuracy negatively, i.e. if one chamber is full and the next is empty the apparatus measure half full for both.

In a second aspect the invention relates to a method for continuous, gravimetric metering and mass flow determination of flowable materials. A metering device determines an instantaneous mass flow at an anticipatory control point ahead of a delivery point for the flowable material. The discharge of the flowable material is affected by altering a speed of rotation of the metering device. A distance of the anticipatory control point ahead of the delivery point is determined to match at least one of a current actual speed and a loading of the metering device.

By regulating the metering device and thus the discharge for regulating the feed strength at an anticipatory control point calculated from the current actual speed and in direct dependence on the instantaneous mass flow determined at the metering device, a highly accurate compensation for disturbing values results still before transfer of the bulk goods at the point of delivery or process system, so that a particularly high short-term metering accuracy is achieved. Regulation of the actual feed strength to the set-point value as adjusted is thus effected with practically no dead time, since it is determined accurately when or at what angle the mass deviation will arrive at the delivery point and this can be compensated for accordingly by increasing or reducing the conveyor speed.

This is particularly important in coal dust metering for achieving a constant burning process or in flue gas purification. This compensation for disturbing values in the metering ahead of transfer of the conveyed material into the chemical or thermal process thus facilitates a particularly high short-term metering accuracy in the manner of anticipatory regulation, wherein the use of a metering rotor in particular allows a highly accurate mass flow determination through a wide range of adjustment of the set-point feed strength.

Preferred embodiments are the subject matter of the dependent claims, wherein in particular the possibility of monitoring by measurement of the actually attained actual speed at a monitoring point and a following correction is especially advantageous, since residual regulation deviations can be avoided by this.

The first and second aspects of the present invention may be combined.

In the present context a number of terms are used in a manner being ordinary to the skilled person. Some of these terms are detailed below:

Sectoral load measurement is preferably used to mean/denote a mathematical split of the rotor weighing path into multiple sectors for the purpose of identifying the load in each piece of a multiple set of pieces together comprising the complete load of all chambers of the rotor currently in the complete rotor weighing path.

BRIEF DESCRIPTION OF THE FIGURES

The figures show one way of implementing the present invention and is not to be construed as being limiting to other possible embodiments falling within the scope of the attached claim set.

Embodiments of the invention, by way of example only, will be described with reference to the accompanying figures in which.

DETAILED DESCRIPTION OF THE INVENTION

Figure 1:
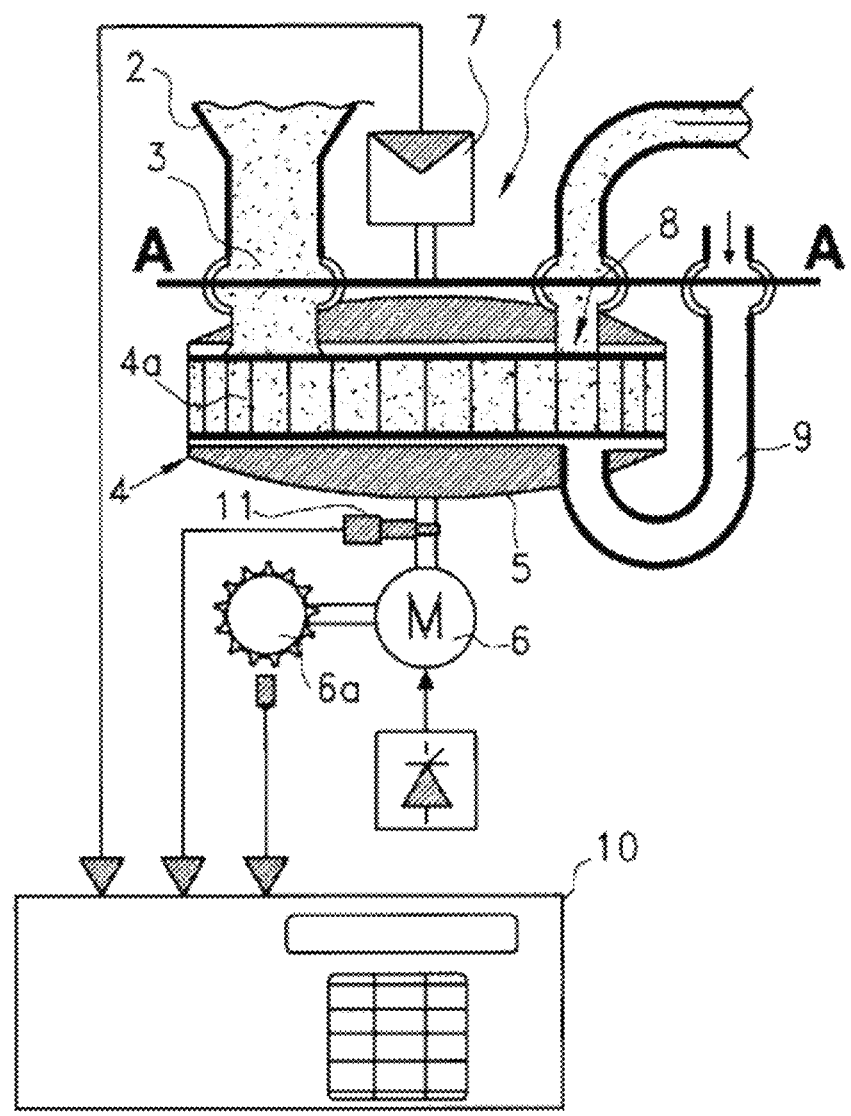
FIG. 1 is a sectional view through an apparatus for continuous gravimetric bulk goods metering with a metering rotor as the metering device.
Figure 2:
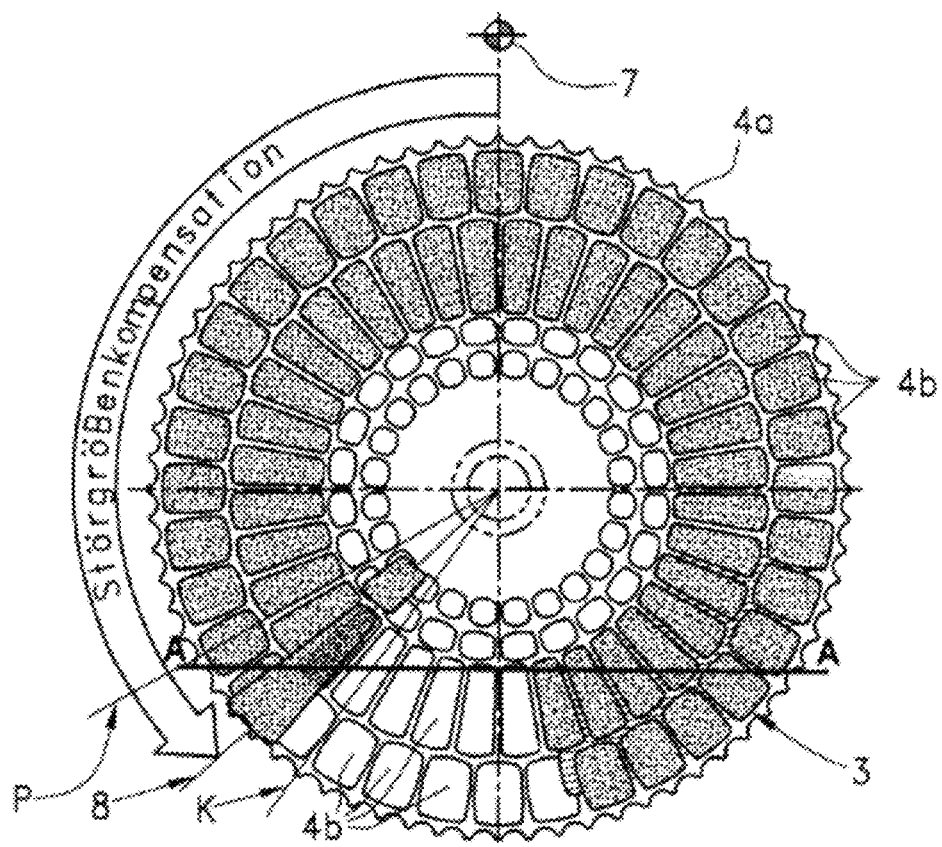
FIG. 2 is a schematic plan view according to FIG. 1.
Figure 3:
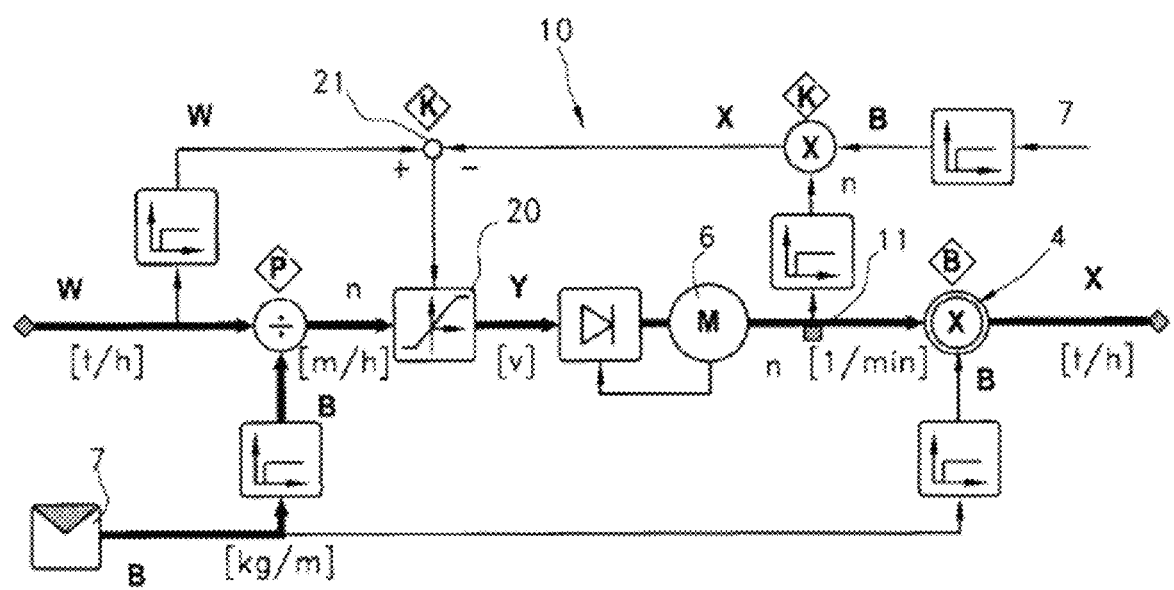
FIG. 3 is a block diagram of the preferred regulating circuit for the metering according to FIG. 1 and FIG. 2.

FIG. 1 schematically illustrates an apparatus 1 for continuous gravimetric metering and mass flow determination, wherein the feed material, especially a free-flowing bulk material to be metered in accordance with an adjustable set-point feed strength, is fed out of a hopper or silo 2 by means of a feeder 3. The feed material passes to a metering device 4 which is arranged inside a housing 5 and defines therewith a measuring path over about 300 of circumference (cf. FIG. 2), up to a delivery point 8. The metering device 4 is preferably formed as a metering rotor 4a, as is described in more detail in DE 3 217 406 A1. This metering rotor 4a is mounted on a pivotal axis A-A running laterally from the housing 5 and is driven by a speed controlled electric motor 6 as a drive source. The housing 5 of the metering rotor 4a is supported for limited pivotal movement on a load cell 7. The supporting moment on the load cell 7 mounted spaced laterally from the pivotal axis A-A is directly proportional to the mass of the material stream transported through the measuring path of the metering rotor 4a from the feeder 3 to the delivery point 8. A blow-out line 9 opens into the delivery point 8 at the lower end of the housing 5. The load cell 7, a speed of rotation sensor 11 provided on the rotor shaft and a tacho generator 6a of the drive source 6 are connected to an electronic metering controller 10, which thus determines the instantaneous mass flow X by multiplication of the instantaneous loading B by the speed of rotation/angular velocity and places it in relation to the set-point feed strength W as adjusted, as well as controlling a setting value Y of the drive motor 6 of the metering rotor 4a, e.g. through a thyristor, in order to vary the speed of rotation or angular velocity and thus keep the adjusted feed strength constant. If there is a negative deviation of the loading B at the metering device (e.g. –0.2%), the angular velocity of the metering rotor 4a is raised by the corresponding value in order keep the feed strength X constant, accordingly by +0.2% in this case, as is known per se through the regulating path shown in a heavier line in FIG. 3. What is important here is that, by the determination of the angular distance for the anticipatory control point P ahead of the delivery point 8 (cf. FIGS. 2 and 3), geometrically determined provisions are provided such that it can be accurately calculated by the metering controller 10 at what point in time the disturbing value (e.g. the deviation of −0.2%) will occur at the delivery point 8. Depending on the actual speed of the metering rotor 4a which is also measured, an accurate advance time interval can be determined having regard to the advance angle from the metering device 4 and the corresponding cell 4b of the metering rotor 4a and the speed of rotation/rpm, after which the disturbing value (negative deviation) occurs after determination at the load cell 7 at the delivery point 8, i.e. where the blow-out line 9 opens. The metering controller 10 can thus give the corresponding command, shortly in advance to take into account the inertia of the metering rotor 4a, to increase the speed by e.g. 0.2%. An anticipatory regulation of the actual feed strength is thus possible with this device in real-time. A plan view of the device according to FIG. 1 is shown in FIG. 2, wherein the cellular formation of the metering rotor 4a in particular can be seen, likewise the arrangement of the delivery point 8 and of the anticipatory control point P ahead thereof in the direction of rotation and a following monitoring point K. In an advantageous design, in order largely to minimize the regulation deviations, the actual speed can be detected by the speed sensor 11 and be compared in a comparator 21 (cf. FIG. 3 upper control path) with the speed value controlled at the anticipatory control point P and be fed to an integrator 20 with a long time constant 20. If for example the control value Y provided at the anticipatory control point P to the drive motor 6 was not sufficient for the desired feed strength on account of the overall inertia, by advancing the anticipatory control point P (from here about 20 to about 25 ahead of the delivery point 8) the required interval of time for the acceleration/braking of the metering rotor 4a with timely attainment of the controlled speed at the delivery point is provided and thus the set mass flow W is adjusted to with the metering device 4. The anticipatory control point P should be as near as possible to the delivery point 8, so that drive means 6 which can accelerate/brake strongly are advantageous. A regulating block diagram for the continuous gravimetric metering and mass flow determination at the sequential positions in the feed direction (shown in diamonds) of the anticipatory control point P, the delivery point 8 and the monitoring point K is shown in FIG. 3, wherein the components in FIG. 1 and FIG. 2 are connected to the metering controller 10, with otherwise like construction, which controls the discharge rate X from the housing 5 of the metering device 4 in dependence on the instantaneous mass flow (loading B) established by the metering device 4. Depending on the instantaneous loading B the beginning or start point of the speed regulation of the drive motor 6 can thus be varied, taking into account the current inertial moment, in order to maintain the set-point feed strength W. The fixed geometric parameters, such as own mass and circumference of the metering rotor 4a, angle between the center of the delivery point 8 and the monitoring point K, are stored in the metering controller 10, so that it can be found accurately from a measured actual angular velocity when the loading B determined by the metering device 4 arrives at the delivery point 8 and thus suitable follow up regulation by accelerating/decelerating the feed speed can be undertaken.

Figure 4:
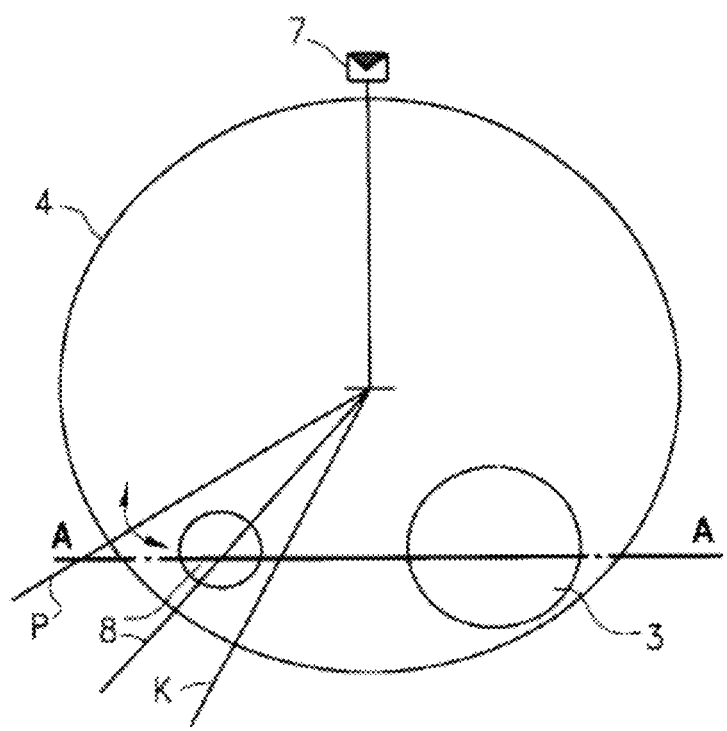
FIG. 4 is a schematic view of the metering device from a top view.

FIG. 4 is a schematic view of the metering device 4 from a top view, schematically illustrating the anticipatory control point P, delivery point 8, monitoring point K, feeder 3, the load cell 7 and the pivotal axis A-A.

Figure 5:
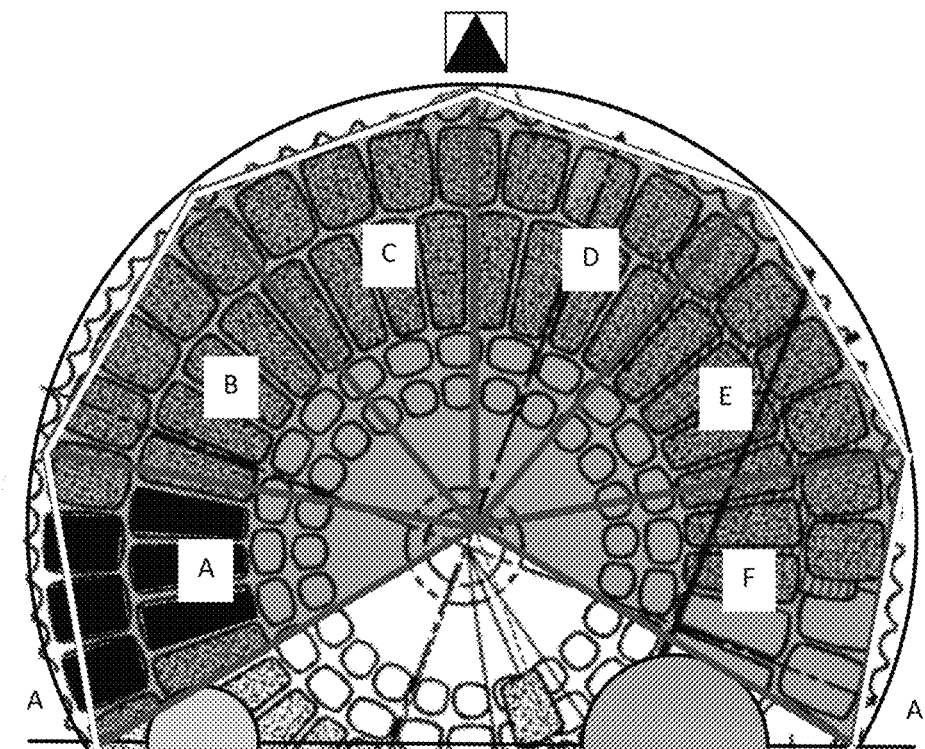
FIGS. 5 and 6 are schematic views of the metering device from a top view, wherein the chambers are divided in sectors A-F.
Figure 6:
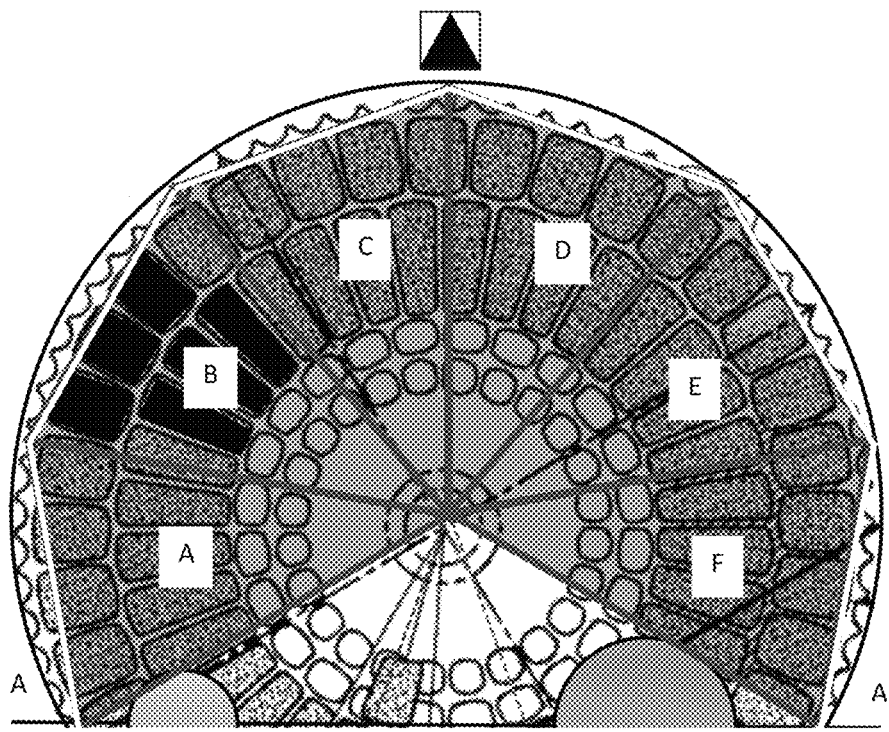

FIGS. 5 and 6 are schematic views of the rotor weighing path from a top view, wherein the chambers are divided in sectors A-F.

In FIGS. 5 and 6, the sparked chambers have loading "alpha" and the black chambers have loading "beta". In FIG. 5, with the sectoral load measurement according to the present invention, the system can detect that the chambers in sector A have a different loading than the chambers in sectors B to F.

In FIG. 6, as the rotor rotates the system knows when these chambers with loading "beta" will be in sector B. Mathematically the system can calculate the effect on the total load measurement which allows the system to detect that the new chambers in sector A have the loading "alpha" again. Further the system knows when the chambers with loading "beta" will be discharged (after sector F) which enables the system to adjust the motor speed more correctly compared to prior art where it only have the integral over all chambers in the rotor weighing path.

The apparatus and method according to the present invention measures the load of material in the rotor to adjust the motor speed in a way that feed rate (load x revolution speed) is constant. In the prior art this is performed by measuring the integral complete load of all rotor chambers together. This is sufficiently correct as long as the load level in the individual rotor chamber does not deviate too much and is approximately constant.

The sectoral load measurement according to the present invention, is dividing a weighing path affecting the load measured at a load cell which is a sector in the range of 200 to 300 degrees of a total of 360 degree rotor circle to a multiple of smaller sectors in the range of 1 to 20 degrees, such as 5 degrees, to calculate an integral of the load.

The sectors can also be in the range of 20 to 100 degrees. As an example, dividing the sectors in 100 degrees would mean two to three sectors.

Although the metering device has been described as a metering rotor 4a, the illustrated control and regulating method can also be used with a metering belt balance or a metering auger conveyor to enhance the short-term metering accuracy at the delivery or discharge point, since substantial inertial moments can also occur here.

Although the present invention has been described in connection with the specified embodiments, it should not be construed as being in any way limited to the presented examples. It should also be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

LIST OF REFERENCES

1: Apparatus
2: Hooper, Silo
3: Feeder
4: Metering device
4a: Metering rotor
4b: Cell
5: Housing
6: Motor
6a: Tacho generator
7: Load cell
8: Delivery point 9: Blow out line
10: Controller
11: Speed sensor
20: Integrator
21: Comparator

What is claimed is:

1. A method for continuous, gravimetric metering and mass flow determination of flowable materials, comprising: determining with a metering device an instantaneous mass flow at an anticipatory control point located a first distance ahead of a delivery point for the flowable material; affecting discharge of the flowable material by altering a speed of rotation of the metering device; and varying the first distance of the anticipatory control point ahead of the delivery point depending on at least one of the speed of rotation and a loading of the metering device, wherein the loading of the metering device is calculated on the basis of a sectoral load measurement, wherein said sectoral load measurement is dividing a weighing path affecting the load measured at a load cell which is a sector in the range of 200 to 300 degrees of a total of 360 degrees rotor circle into a multiple of smaller sectors to calculate an integral of the load and wherein the dividing of the weighing path affecting the load measured at the load cell is performed over time so a change of an integral of time facilitates a determination of a load on a pre-selected chamber to control a feed rate of the flowable material so that the feed rate is constant.

2. The method for continuous, gravimetric metering and mass flow determination of flowable materials according to claim 1, wherein the weighing path is divided into the smaller sectors in the range of 1 to 20 degrees.

3. The method for continuous, gravimetric metering and mass flow determination of flowable materials according to claim 1, wherein the weighing path is divided into the smaller sectors in the range of 20 to 100 degrees.

4. The method for continuous, gravimetric metering and mass flow determination of flowable materials according to claim 1, further comprising measuring the speed of rotation of the metering device at the delivery point or shortly thereafter at a monitoring point.

5. The method for continuous, gravimetric metering and mass flow determination of flowable materials according to claim 4, further comprising, taking into account in one of subsequent speed control operations, a deviation between the speed of the rotation of the metering device set at the anticipatory control point and the speed of the rotation of the metering device measured at the monitoring point.

6. The method for continuous, gravimetric metering and mass flow determination of flowable materials according to claim 5, further comprising detecting and storing, the deviation in relation to a set-point speed, in a metering controller.

7. The method for continuous, gravimetric metering and mass flow determination of flowable materials according to claim 6, wherein the metering device is a metering rotor.

8. The method for continuous, gravimetric metering and mass flow determination of flowable materials according to claim 1, comprising:
adjusting a motor speed based on the determination of the load on the pre-selected chamber to control the feed rate of the flowable material so that the feed rate is constant.

* * * * *